Dec. 24, 1968 SHOICHI TERAOKA 3,417,433
PLURAL NOZZLES, PLURAL MOLDS, INJECTION MOLDING MACHINE
Filed Nov. 17, 1965
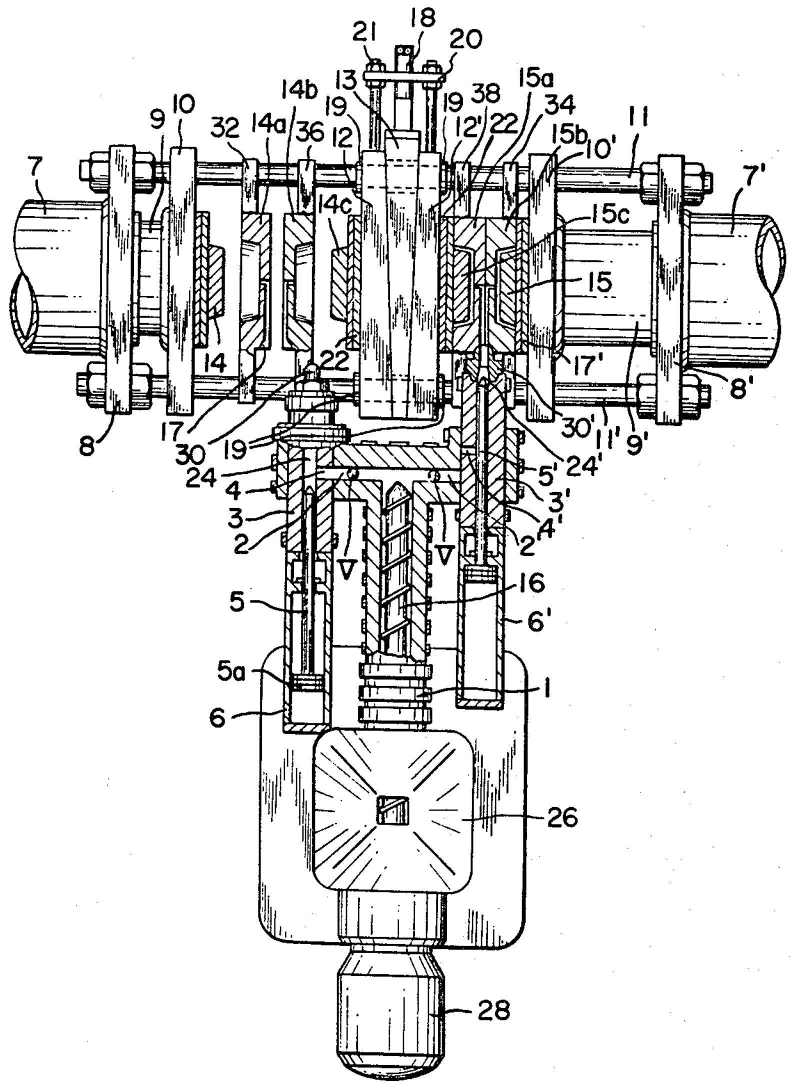
INVENTOR
SHOICHI TERAOKA
BY McGlew and Toren
ATTORNEYS

United States Patent Office 3,417,433
Patented Dec. 24, 1968

3,417,433

PLURAL NOZZLES, PLURAL MOLDS, INJECTION MOLDING MACHINE

Shoichi Teraoka, Hiroshima-ken, Japan, assignor of fifty percent to Shin-Etsu Chemical Industry Co. Ltd., Chiyoda-ku, Tokyo, Japan Filed Nov. 17, 1965, Ser. No. 508,264
Claims priority, application Japan, Nov. 20, 1964, 39/65,546
5 Claims. (Cl. 18—30)

ABSTRACT OF THE DISCLOSURE

An injection molding machine comprises a plurality of platens which may be slid along guide bars arranged on each side of a closing wedge member and which may be moved together by a ram to define a molding cavity on each side of the wedging member which may be selectively aligned in a closed position with an infeed gate of a respective one of two injection nozzles for the material to be molded. Each mold may be opened to a position in which the gate is no longer aligned with its associated nozzle. The construction further includes a rotating feed screw for conveying material in a plasticized form selectively to one of the two laterally extending side head portions serving the two nozzles. Each head member carries an injection piston which is reciprocable under the control of fluid pressure to force material to be molded into the mold cavity through the gate thereof.

This invention relates, in general, to injection molding machines, and in particular to a new and useful injection molding machine having an injector with a plurality of heads which may be selectively engaged with a plurality of mold elements.

A disadvantage of the present injection molding machines is that the operational capacity has not been fully utilized because in its operation cycle time required for melting and plasticizing the molding material and injecting it into the cavity of a mold, and the additional time required for cooling a molded product and ejecting it out of the mold, requires a great deal of idle time in the operation of the apparatus.

In accordance with the present invention, there is provided a machine which includes a plurality of injection head elements which are selectively engageable with one of a plurality of mold cavities, the arrangement being such that a disengaged mold may be permitted to cool or be manipulated into position for receiving a new injection while the previous mold is positioned in an operative contact with the injection head.

Accordingly, it is an object of the invention to provide an injection molding machine having injection means which operates selectively on a plurality of mold elements, permitting one of the mold elements to be cooled while the other is in an operating position.

A further object of the invention is to provide an injection molding machine which includes an injection device having two head portions with connecting passages for receiving a shot of injection-molded material and wherein when one is moved out into an operative position with respect to a mold to be filled with the injection material, the other is moved to an inoperative position at which it may receive a charge for the next operation.

A further object of the invention is to provide an injection molding device which is simple in design, rugged in construction and economical to manufacture.

For an understanding of the principles of the invention, reference is made to the following description of a typical embodiment thereof as illustrated in the accompanying drawing.

The only figure of the drawing is a partial top planar and partial sectional view of an injection molding machine constructed in accordance with the invention.

Referring to the drawing, in particular, the invention embodied therein comprises an injection molding apparatus or plastic material plasticizing device generally designated 1 which has a plurality of heads or injection delivery portions in the embodiment illustrated 2, namely 2 and 2'. Each head is provided with a bore adjacent its outer end in which are slidable injection cylinders 3 and 3', respectively. The injection cylinders 3 and 3' are slidable in directions toward and away from mold cavity-forming members with which they are associated.

The injection cylinders 3 and 3' have material charge passageways or receiving ports 4 and 4' which are selectively alignable with similar passages defined in the heads 2 and 2' to receive a charge therefrom. The charge is stored in respective central elongated cavities 24 and 24' defined in the cylinders.

Material to be plasticized is dropped into a hopper 26 and is fed by a rotating screw conveyor 16 driven by a motor 28 from the hopper 26 to the passages defined in the heads 2 and 2'. Check valves designated V are located in each of the passages and permit flow only from the conveyor outwardly to the respective receiving ports 4 and 4'. When the cylinder 3 is in the position indicated to the left of the drawing, its passage 4 communicates with the passage in the head 2 and it receives a charge which is stored in the bore 24.

The charge is expelled from a forward nozzle portion 30 or 30' after the latter is alligned with the respective mold carrier and a plunger 5 is reciprocated along the bore 24 to inject the charge into the mold. The plunger includes a piston portion 5*a* which is slidable in a cylinder 6 and suitable control fluid is admitted to the cylinder in order to cause the desired outward reciprocation of one of the cylinder members 3 and inward reciprocation of the other cylinder member 3' in accordance with which one is to be moved to an operative injection position.

In accordance with a further feature of the invention, at least two mold cavities are mounted so that they may be aligned with a selected nozzle 30 and 30' to receive an injection or be moved away for cooling purposes and for separation and removal of the injected part. For this purpose, there are provided supporting members 8 and 8' on each side of heads 3 and 3', respectively, which mount pressure cylinders 7 and 7', respectively, in which are slidable closing pistons 9 and 9', respectively. The pistons 9 and 9' engage movable platens 10 and 10' which carry mold portions 14 and 15, respectively. The platens 10 and 10' are guided adjacent their peripheries on rod members 11 and 11' which are carried by the fixed portions 8 and 8'. A complementary movable mold element 14*a* is carried on a platen 32 which is slidable on the supports 11 and 11'. A similar mold part 15*a* is carried on a platen 34 which is movable on the rod elements 11 and 11'. Mold parts 14*b* and 15*b* are carried on platens 36 and 38 which are slidable on the guide rods 11 and 11'. Finally, inner mold parts 14*c* and 15*c* are carried on wedge-shaped platens 12 and 12' which are adjustably fixed centrally at an adjusted location along the rods 11 and 11'. Between the two wedge-shaped platens 12 and 12' is located a wedge-shaped board element 13 which carries a feed bolt 18 at its upper end. The feed bolt 18 is threaded into a supporting frame 20 carried between the platens 12 and 12' and secured in position by locking nuts 21, 21.

As indicated at the right of the drawing, the ram 9' is moved outwardly to cause the associated platens 10', 38 and 34 to move against the fixed platen 12' to effect a complete assembly of the mold and alignment of the runner gate 17' with the nozzle 30' which may be then discharged. The material carried in the cylinder 3' may be then discharged through the nozzle 30' and into the mold cavity by reciprocation of the plunger 5' which is effected by control means (not shown).

At the same time, the cylinder 3 is retracted and the port 4 is aligned with the bore of the head 2 and receives a new charge of material. The mold parts of the left-hand portion of the drawing are shown separated after the part which has been previously molded therein has been removed. After completion of the injection by the outward movement of the storing cylinder 3', it is retracted and the mold cavity is permited to cool and then the mold parts are later separated. The mold parts on the opposite side are then moved together to align them with the nozzle 30 when the cylinder 3 is moved outwardly to an injection position at which nozzle 30 aligns with the runner 17. Injection of the material to be molded into the mold cavities may then be effected.

During the operation the plasticizing screw conveyor 16 is rotated continuously and the cylinders 3 and 3' are moved alternately in opposite directions in order to provide for the alternate communication and disconnection of the receiving ports with the heads 2 and 2'. When one of the cylinder heads 3 is moved to an operative position for the discharging of a shot of material, the other may be moved to a position at which it receives a shot for the next injection cycle. It is advantageous that the entire system be operated completely automatically which may be done by suitable control means connected to the associated cylinders 6 and 6' and 7 and 7' (not shown). Adjustment of the position of the molds may be made by adjusting the position of the middle platens 12 and 12' as described previously.

The injection molding machine according to the invention may carry out the operational steps in a manner such that the plastic material may be continuously fed to each of the heads and one of the other reciprocating cylindrical portions may receive a charge as desired. The machine may employ at least two sets of molds whereby the molding operation may be carried out continuously without being interrupted by the necessary cooling of the molds and the ejection of the molding products after cooling. In this manner the injection machine can be operated substantially continuously without cutting down on any of the cooling time required for the cooling of the objects within the mold before they are rejected.

While a specific embodiment of the invention has been shown and described in detail to illustrate the application of the principles of the invention, it will be understood that the invention may be embodied otherwise without departing from such principles.

What is claimed is:

1. An injection molding machine comprising a plurality of mold members defining mold cavities, a plurality of tubular injection members each having a bore for holding a charge of material to be injected into a mold cavity, means mounting said mold members for positioning in alignment with respective ones of said injection members, means mounting said injection members for selective movement into engagement with a mold member for injecting material to be molded into the mold cavity thereof and to subsequently move it out of engagement with said mold member, means for conveying a charge of material in a plasticized condition to said injection members when they are disengaged including an injection head having a central conveying portion and laterally extending side head portions, said injection members being reciprocable in respective ones of said side head portions.

2. An injection molding machine according to claim 1, wherein said injection members include a communicating port extending from the bore thereof for holding the charge outwardly, said head having a conveying passage which aligns with communicating ports when said injection member is retracted away from said mold member.

3. An injection molding machine according to claim 2, including fluid piston means for reciprocating said injection member.

4. An injection molding machine according to claim 2, including a fed conveyor in said head for conveying material and delivering it in a plasticized form to said head passages for delivery to said ports of said injection members when said injection members are in a retracted position.

5. An injection molding machine comprising a plurality of mold members defining mold cavities, a plurality of injection members each having a bore for holding a charge of material to be injected into a mold cavity, means mounting said mold members for positioning in alignment with respective ones of said injection members, means mounting said injection members for selective movement into engagement with a mold member for injecting material to be molded into the mold cavity thereof and to subsequently move it out of engagement with said mold member, and means for conveying a charge of material in a plasticized condition to said injection members when they are disengaged including an injection head having at least two branch portions each with an injection material passage and a main portion, a screw conveyor in said main portion for delivering material in a plasticized form to said branch portions, said injection members being slidable in respective ones of said branch portions and having passage means defined therein which communicates with respective injection material passages of said branch portions for receiving a charge of material when said injection members are in a retracted position.

References Cited

UNITED STATES PATENTS

| | | | |
|---|---|---|---|
| 3,266,086 | 8/1966 | Markevitch | 18—43 X |
| 3,226,770 | 1/1966 | Senfleben | 18—42 |
| 3,063,092 | 11/1962 | Fischer | 18—30 |
| 3,069,722 | 12/1962 | Kato | 18—30 |
| 3,173,176 | 3/1965 | Kobayashi | 18—30 |

FOREIGN PATENTS

| | | |
|---|---|---|
| 767,164 | 1/1957 | Great Britain. |
| 1,169,524 | 9/1958 | France. |
| 1,292,295 | 3/1962 | France. |

WILBUR L. McBAY, *Primary Examiner.*

U.S. Cl. X.R.

264—329